US012744670B2

(12) United States Patent
Kudo et al.

(10) Patent No.: US 12,744,670 B2
(45) Date of Patent: Sep. 22, 2026

(54) AUTHENTICATION SYSTEM, AUTHENTICATION METHOD, AND PROGRAM

(71) Applicant: NTT, Inc.

(72) Inventors: Fumiaki Kudo, Tokyo (JP); Akira Nagai, Tokyo (JP); Yusuke Iijima, Tokyo (JP)

(73) Assignee: NTT, Inc., Tokyo (JP)

( * ) Notice: Subject to any disclaimer, the term of this patent is extended or adjusted under 35 U.S.C. 154(b) by 73 days.

(21) Appl. No.: 18/880,556

(22) PCT Filed: Jul. 4, 2022

(86) PCT No.: PCT/JP2022/026598
§ 371 (c)(1),
(2) Date: Jan. 1, 2025

(87) PCT Pub. No.: WO2024/009355
PCT Pub. Date: Jan. 11, 2024

(65) Prior Publication Data

US 2025/0392464 A1 Dec. 25, 2025

(51) Int. Cl.
*H04L 9/32* (2006.01)
*H04W 4/46* (2018.01)

(52) U.S. Cl.
CPC .......... *H04L 9/3213* (2013.01); *H04L 9/3228* (2013.01); *H04L 9/3263* (2013.01); *H04W 4/46* (2018.02)

(58) Field of Classification Search
CPC ... H04L 9/3213; H04L 9/3228; H04L 9/3263; H04L 2209/84; H04L 9/32; H04L 9/3268; H04W 4/46; G06F 21/44
See application file for complete search history.

(56) References Cited

U.S. PATENT DOCUMENTS

2022/0303124 A1 9/2022 Telephone et al.
2023/0068077 A1* 3/2023 Kashi ................. G07C 9/00309
2024/0138000 A1* 4/2024 Peng ..................... H04W 76/14

FOREIGN PATENT DOCUMENTS

JP 202119223 A 2/2021
WO WO-2021196043 A1 * 10/2021 ............. H04W 4/46

OTHER PUBLICATIONS

Prodrone Co., Ltd. (2021) "Demonstration experiment begins to strengthen drone communication security—GMO Global Sign's security technology makes the sky safer too" Prodrone Co., Ltd., May 14, 2021 [on-line] website: https://www.prodrone.com/jp/release/7589/.

* cited by examiner

*Primary Examiner* — J. Brant Murphy
*Assistant Examiner* — Christopher Lam

(57) ABSTRACT

An authentication system includes: a certificate authority; a central control system; a group including an unmanned vehicle that is a master vehicle and an unmanned vehicle that is a slave vehicle; a management system; and an external system. The central control system includes a first authentication information transmitting unit that transmits, to the master vehicle, first authentication information received from the certificate authority. The master vehicle includes an authentication unit that executes authentication with the slave vehicle belonging to the same group, and a second authentication information transmitting unit that transmits second authentication information including a first token with an expiration date and the first authentication information to the authenticated slave vehicle. The management system includes an authentication unit that executes authentication with the external system; and a third authentication information transmitting unit that transmits, to the authenticated external system, third authentication information including a second token and the first authentication information received from the certificate authority. The slave vehicle and the external system each include an authentication unit that executes authentication based on the second authentication information and the third authentication information.

17 Claims, 20 Drawing Sheets

Figure 8:
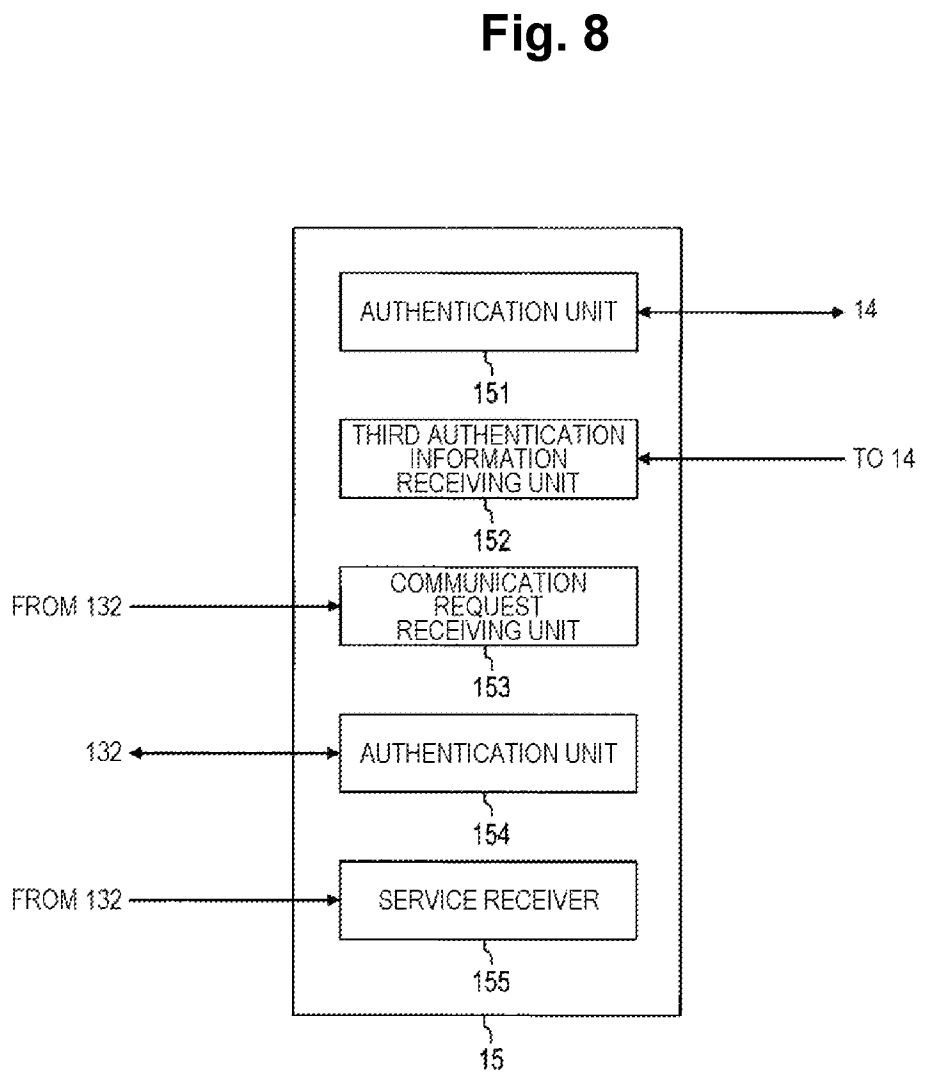

14
TO 14
AUTHENTICATION UNIT 151
THIRD AUTHENTICATION INFORMATION RECEIVING UNIT 152
COMMUNICATION REQUEST RECEIVING UNIT 153
AUTHENTICATION UNIT 154
SERVICE RECEIVER 155
15
FROM 132
132
FROM 132

Fig. 18

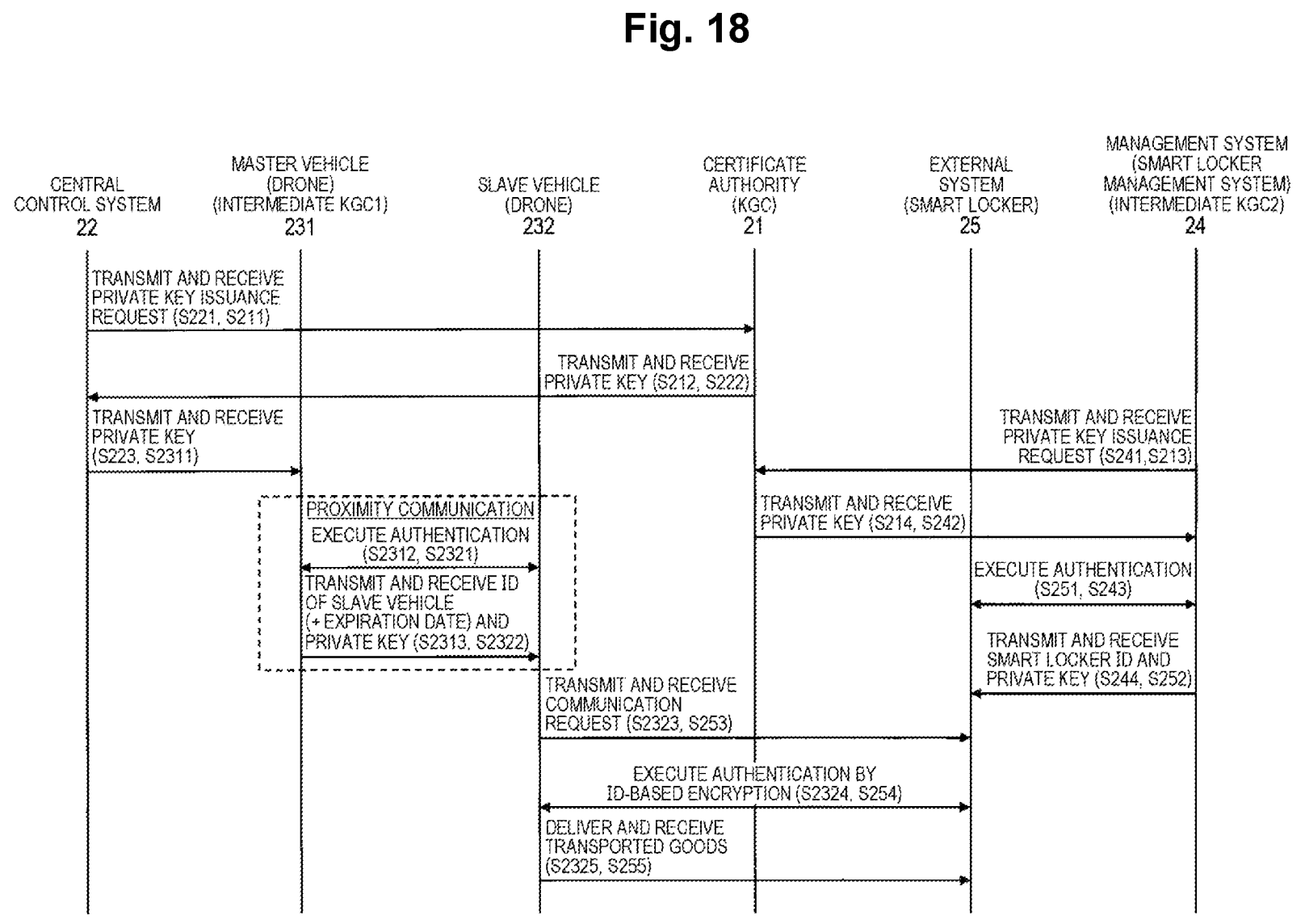

CENTRAL CONTROL SYSTEM 22
MASTER VEHICLE (DRONE) (INTERMEDIATE KGC1) 231
SLAVE VEHICLE (DRONE) 232
CERTIFICATE AUTHORITY (KGC) 21
EXTERNAL SYSTEM (SMART LOCKER) 25
MANAGEMENT SYSTEM (SMART LOCKER MANAGEMENT SYSTEM) (INTERMEDIATE KGC2) 24
TRANSMIT AND RECEIVE PRIVATE KEY ISSUANCE REQUEST (S221, S211)
TRANSMIT AND RECEIVE PRIVATE KEY (S212, S222)
TRANSMIT AND RECEIVE PRIVATE KEY (S223, S2311)
TRANSMIT AND RECEIVE PRIVATE KEY ISSUANCE REQUEST (S241,S213)
PROXIMITY COMMUNICATION
EXECUTE AUTHENTICATION (S2312, S2321)
TRANSMIT AND RECEIVE ID OF SLAVE VEHICLE (+ EXPIRATION DATE) AND PRIVATE KEY (S2313, S2322)
TRANSMIT AND RECEIVE PRIVATE KEY (S214, S242)
EXECUTE AUTHENTICATION (S251, S243)
TRANSMIT AND RECEIVE SMART LOCKER ID AND PRIVATE KEY (S244, S252)
TRANSMIT AND RECEIVE COMMUNICATION REQUEST (S2323, S253)
EXECUTE AUTHENTICATION BY ID-BASED ENCRYPTION (S2324, S254)
DELIVER AND RECEIVE TRANSPORTED GOODS (S2325, S255)

Figure 19:
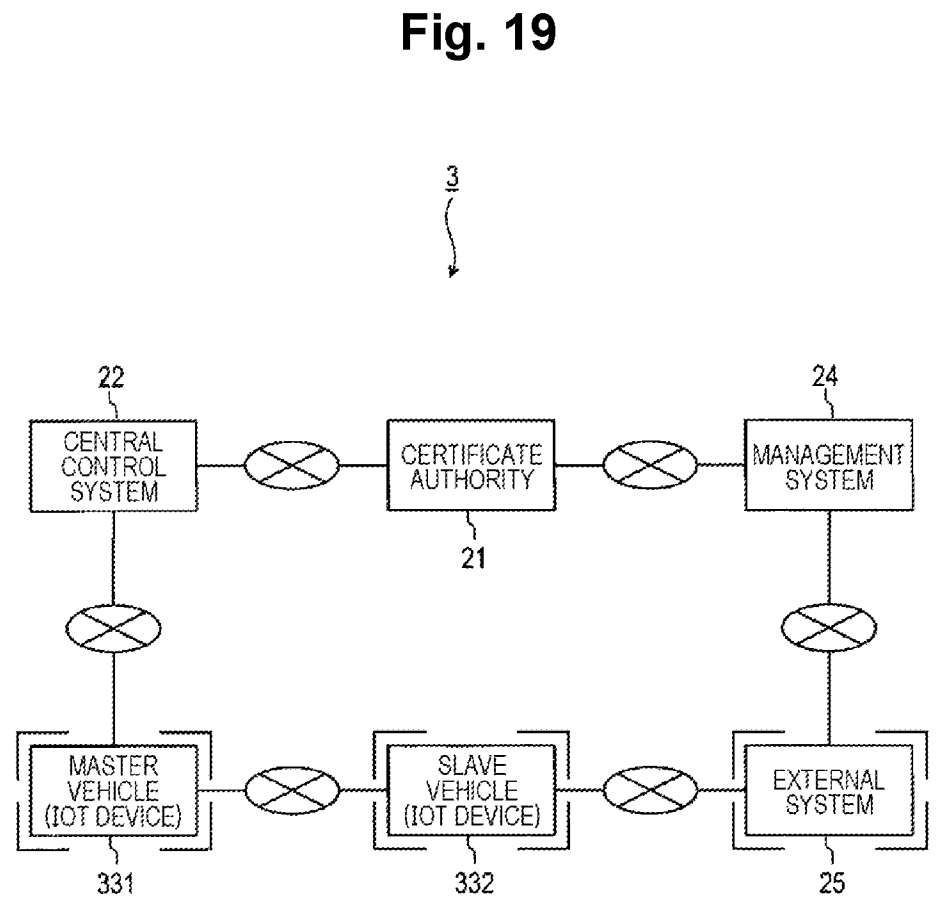

22 CENTRAL CONTROL SYSTEM

21 CERTIFICATE AUTHORITY

24 MANAGEMENT SYSTEM

331 MASTER VEHICLE (IOT DEVICE)

332 SLAVE VEHICLE (IOT DEVICE)

25 EXTERNAL SYSTEM

Fig. 20

COMPUTER 10000

10050 DISPLAY UNIT

10040 OUTPUT UNIT

10030 INPUT UNIT

RECORDING UNIT 10020

CONTROL UNIT 10010

AUTHENTICATION SYSTEM, AUTHENTICATION METHOD, AND PROGRAM

CROSS-REFERENCE TO RELATED APPLICATIONS

This application is a U.S. 371 Application of International Patent Application No. PCT/JP2022/026598, filed on 4 Jul. 2022, the disclosure of which is hereby incorporated herein by reference in its entirety.

TECHNICAL FIELD

The present invention relates to an authentication system that authenticates an unmanned vehicle, an authentication method, and a program.

BACKGROUND ART

In services using unmanned vehicles (vehicles or transport machinery without people on board), that unmanned vehicles form a group and provide a service is also conceivable, and it is assumed that secure management of a very large number of unmanned vehicles will need to be performed in the future.

In the management of unmanned vehicles, there is a demand for a highly flexible management method, for example, in which a group of unmanned vehicles can exchange slave vehicles between master vehicles depending on situations.

As a method of realizing authentication of an IoT device or an unmanned vehicle, a system (Non Patent Literature 1) for distributing an electronic certificate and a private key from a central system side to the IoT device or the unmanned vehicle has been disclosed.

CITATION LIST

Non Patent Literature

Non Patent Literature 1: Prodrone Co., Ltd., "PRODRONE Enters Basic Agreement With GMO GlobalSign To Conduct Demonstration Tests For Secure Drone Operation", [online] May 14, 2021 Prodrone Co., Ltd., [retrieved on Jun. 20, 2022], Internet <URL: https://www.prodrone.com/jp/release/7589/>

SUMMARY OF INVENTION

Technical Problem

FIG. 1 illustrates a configuration example of a service providing system using an unmanned vehicle that may be realized in the future. As illustrated in the drawing, in this configuration example, the central control system 92 and N groups 93 (93-1, . . . 93-*n*, . . . , 93-N, here, N is an integer of 1 or larger) including a master vehicle 931 and a slave vehicle 932 are included. The master vehicle 931 belonging to an n-th group is denoted as a master vehicle 931-*n*.

In the drawing, for convenience, the number of all slave vehicles 932 in each group is set to M (M is an integer of 1 or larger), and the number of slave vehicles 932 may be different for each group. The slave vehicle 932 belonging to the n-th group and corresponding to an m-th vehicle in the group is denoted as a slave vehicle 932-*n*-*m*. This notation method is also applied to Examples to be described below.

In order for the unmanned vehicles to securely communicate with each other or with another system, it is necessary to distribute, to the unmanned vehicles, authentication information for enabling each vehicle to be identified. However, in a case where the values of N and M in FIG. 1 are large, that is, in a case where there are a very large number of unmanned vehicles, it is difficult to perform central management of the authentication information or authority of all of the individual vehicles. In addition, it is necessary to appropriately control the authentication information or authority at the time of regrouping, but when the very large number of groups is enormous, it is difficult to perform central management of the groups.

In this respect, an object of the present invention is to provide an authentication system capable of performing central management of authentication information or authority of management targets even in a case where there are a very large number of unmanned vehicles or groups of unmanned vehicles which are the management targets.

Solution to Problem

An authentication system of the present invention includes: a certificate authority; a central control system; a group including an unmanned vehicle that is a master vehicle and an unmanned vehicle that is a slave vehicle; a management system; and an external system.

The central control system includes a first authentication information transmitting unit that transmits, to the master vehicle, first authentication information received from the certificate authority.

The master vehicle includes an authentication unit that executes authentication with the slave vehicle belonging to the same group, and a second authentication information transmitting unit that transmits second authentication information including a first token with an expiration date and the first authentication information to the authenticated slave vehicle.

The management system includes an authentication unit that executes authentication with the external system; and a third authentication information transmitting unit that transmits, to the authenticated external system, third authentication information including a second token and the first authentication information received from the certificate authority.

The slave vehicle and the external system each include an authentication unit that executes authentication based on the second authentication information and the third authentication information.

Advantageous Effects of Invention

According to an authentication system of the present invention, it is possible to perform central management of authentication information or authority of management targets even in a case where there are a very large number of unmanned vehicles or groups of unmanned vehicles which are the management targets.

BRIEF DESCRIPTION OF DRAWINGS

FIG. 8 is a block diagram illustrating a functional configuration of an external system of Example 1.

FIG. 18 is a sequence diagram illustrating an operation of the authentication system of Example 2.

FIG. 19 is a block diagram illustrating a functional configuration of an authentication system of Example 3.

FIG. 20 is a diagram illustrating a functional configuration example of a computer.

DESCRIPTION OF EMBODIMENTS

Figure 1:
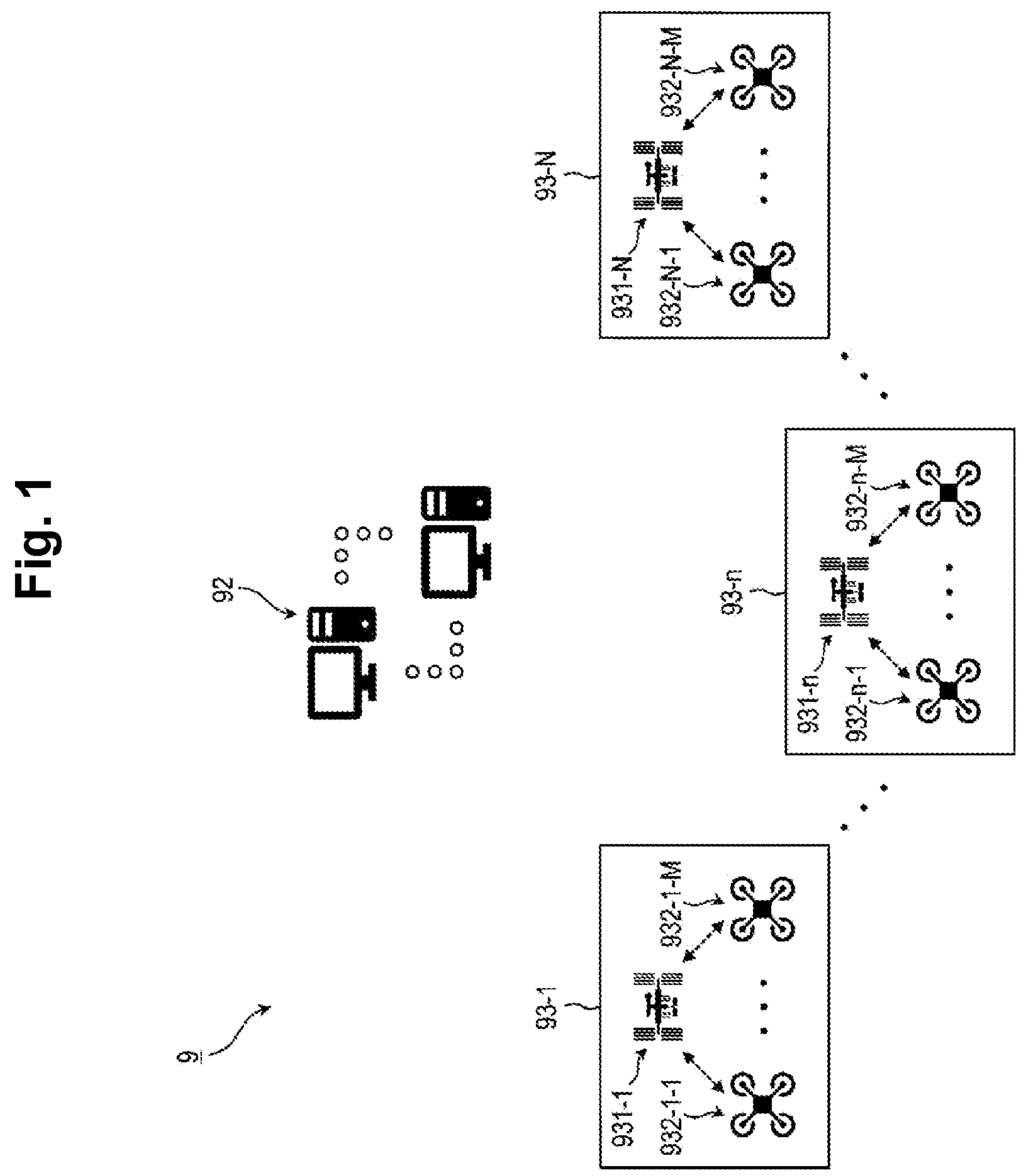
FIG. 1 is a diagram illustrating a configuration example of a service providing system using an unmanned vehicle that may be realized in the future.

Hereinafter, embodiments of the present invention will be described in detail. Note that components having the same functions will be denoted by the same reference numerals, and redundant description will be omitted.

Example 1

Figure 2:
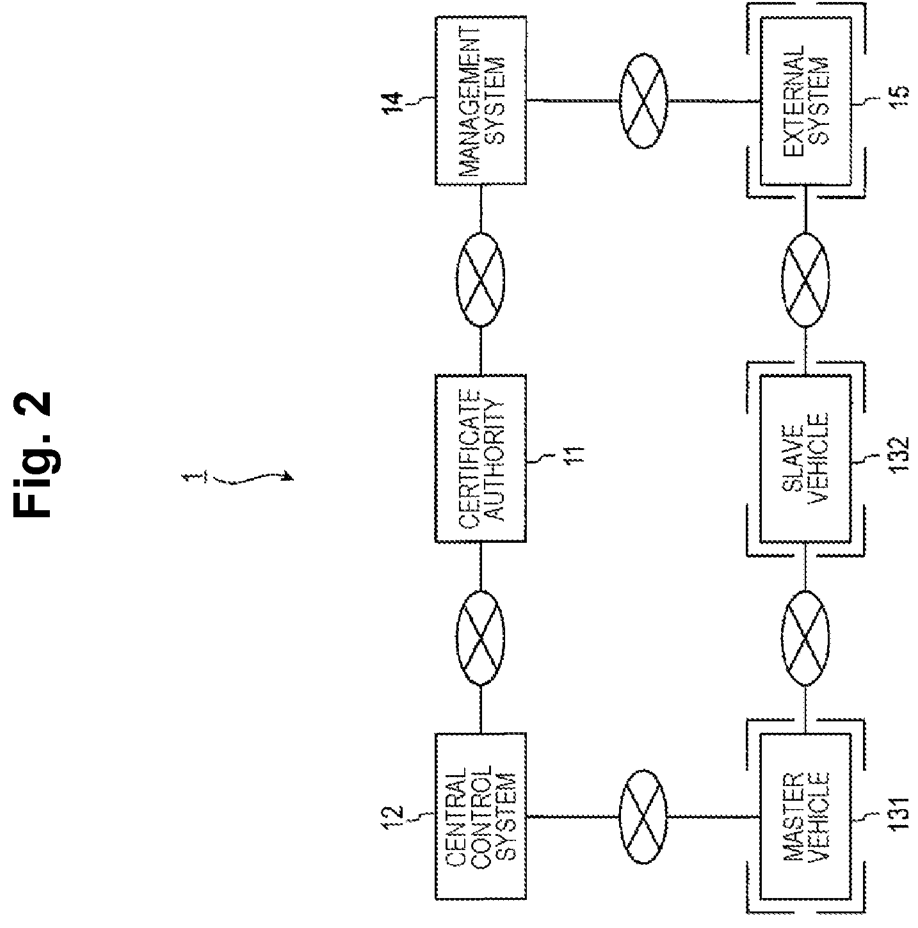
FIG. 2 is a block diagram illustrating a functional configuration of an authentication system of Example 1.

Hereinafter, configurations of an authentication system 1 of Example 1 will be described with reference to FIG. 2. As illustrated in the drawing, the authentication system 1 of the present example includes a certificate authority 11, a central control system 12, a master vehicle 131, a slave vehicle 132, a management system 14, and an external system 15. The master vehicle 131, the slave vehicle 132, and the external system 15 are disposed in a secure environment such as a TEE or an SE, and each block is illustrated in square brackets to indicate a state of being disposed in the secure environment.

Note that the present system includes N groups 13 (group 13-1, . . . , group 13-*n*, . . . , group 13-N, here, N is an integer of 1 or larger) including one master vehicle 131 and M slave vehicles 132. A plurality of master vehicles 131 may belong to one group. The number of slave vehicles 132 may be different for each group.

The master vehicle 131 belonging to an n-th group is denoted as a master vehicle 131-*n*, and the slave vehicle 132 belonging to the n-th group and corresponding to an m-th vehicle in the group is denoted as a slave vehicle 132-*n*-*m*. When the master vehicle 131 and the slave vehicle 132 are denoted without sub-numbers being appended, the master vehicle and the slave vehicle refer to any master vehicle and slave vehicle.

Figure 3:
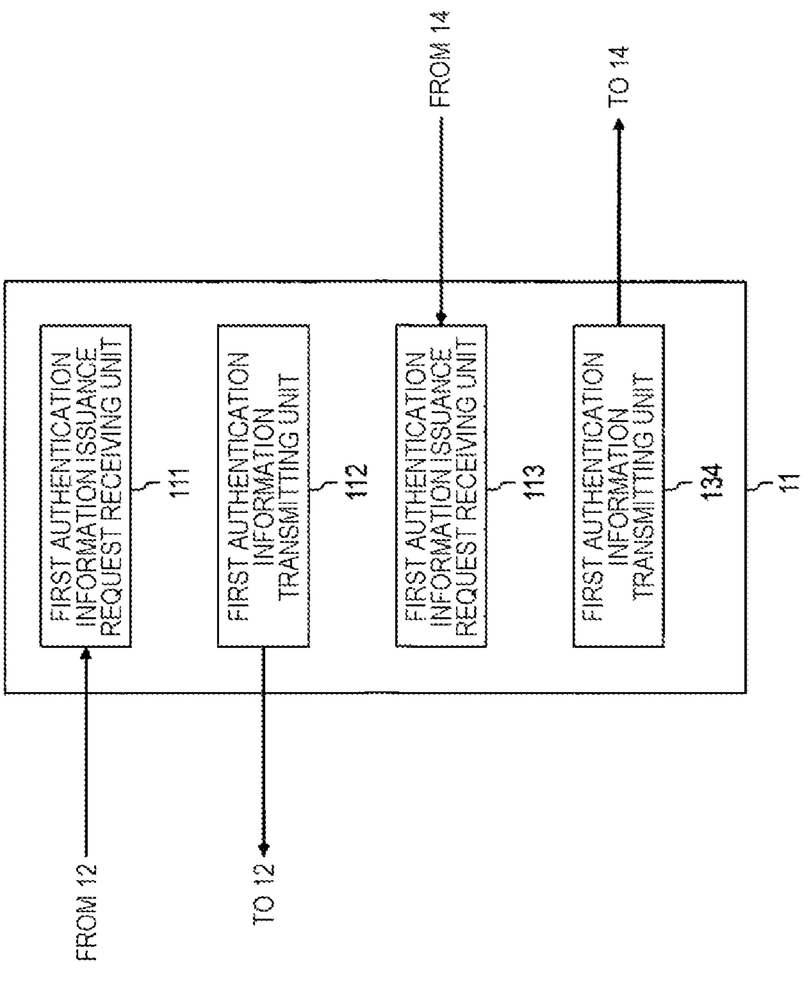
FIG. 3 is a block diagram illustrating a functional configuration of a certificate authority of Example 1.

Hereinafter, a functional configuration of the certificate authority 11 will be described with reference to FIG. 3. The certificate authority 11 includes a first authentication information issuance request receiving unit 111, a first authentication information transmitting unit 112, a first authentication information issuance request receiving unit 113, and a first authentication information transmitting unit 134.

Figure 4:
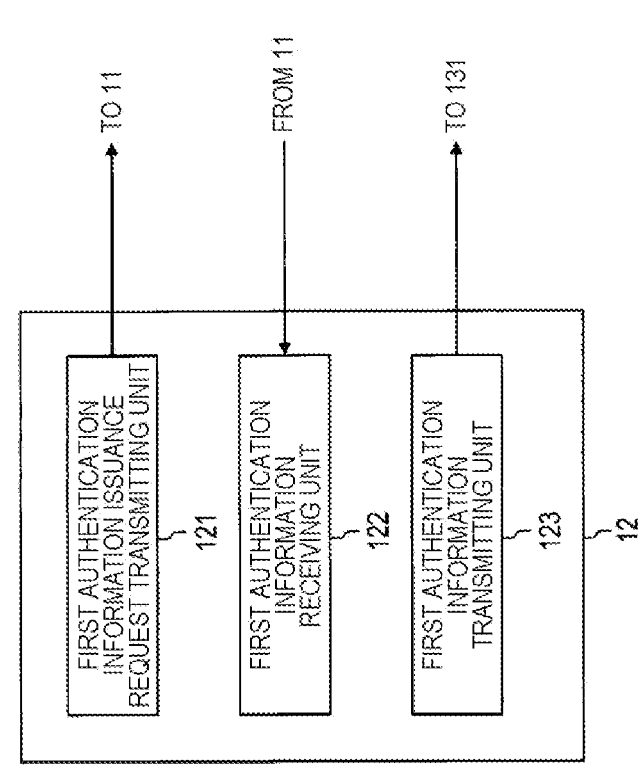
FIG. 4 is a block diagram illustrating a functional configuration of a central control system of Example 1.

Hereinafter, a functional configuration of the central control system 12 will be described with reference to FIG. 4. The central control system 12 includes a first authentication information issuance request transmitting unit 121, a first authentication information receiving unit 122, and a first authentication information transmitting unit 123. In a case where the central control system 12 is configured of a plurality of devices, the configurational components (121 to 123) may be provided as respective separate devices. In addition, the central control system may be configured to include a device having two functions of the configurational components and a device having one function of the configurational components.

Figure 5:
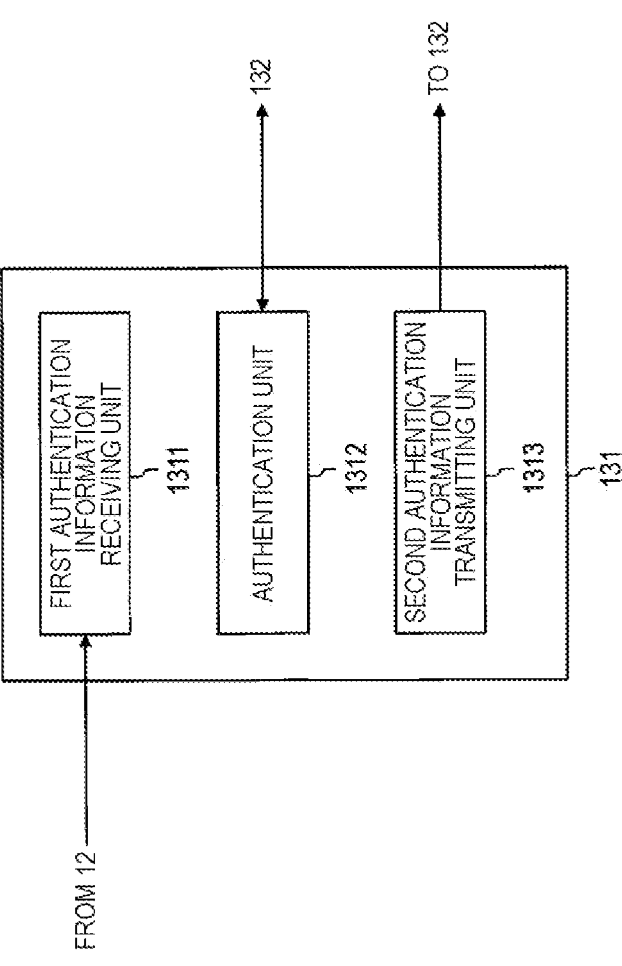
FIG. 5 is a block diagram illustrating a functional configuration of a master vehicle of Example 1.

Hereinafter, a functional configuration of the master vehicle 131 will be described with reference to FIG. 5. The master vehicle 131 includes a first authentication information receiving unit 1311, an authentication unit 1312, and a second authentication information transmitting unit 1313.

Figure 6:
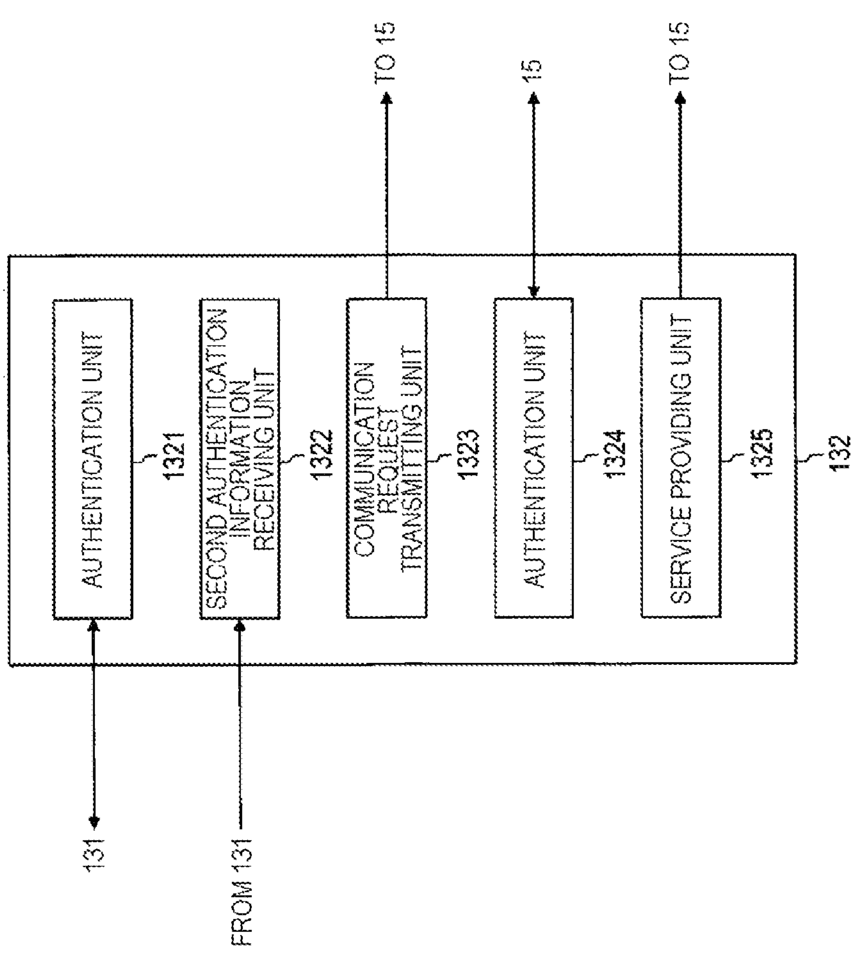
FIG. 6 is a block diagram illustrating a functional configuration of a slave vehicle of Example 1.

Hereinafter, a functional configuration of the slave vehicle 132 will be described with reference to FIG. 6. The slave vehicle 132 includes an authentication unit 1321, a second authentication information receiving unit 1322, a communication request transmitting unit 1323, an authentication unit 1324, and a service providing unit 1325.

Figure 7:
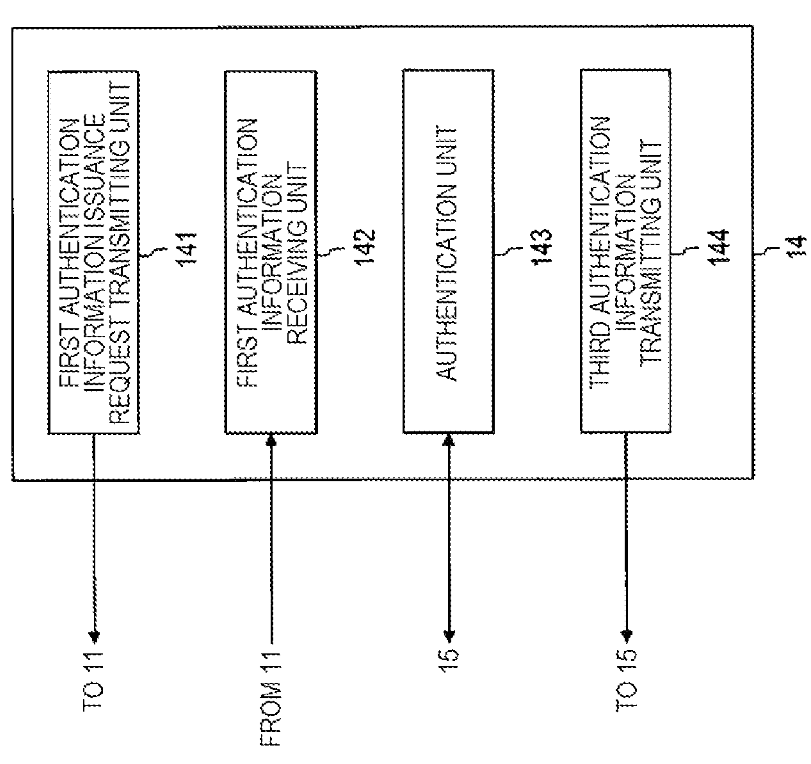
FIG. 7 is a block diagram illustrating a functional configuration of a management system of Example 1.

Hereinafter, a functional configuration of the management system 14 will be described with reference to FIG. 7. The management system 14 includes a first authentication information issuance request transmitting unit 141, a first authentication information receiving unit 142, an authentication unit 143, and a third authentication information transmitting unit 144. In a case where the management system 14 is configured of a plurality of devices, the configurational components (141 to 144) may be provided as respective separate devices. In addition, the management system may be configured to include a device having two or more functions of the configurational components and a device functioning as another configurational component.

Hereinafter, a functional configuration of the external system 15 will be described with reference to FIG. 8. The external system 15 includes an authentication unit 151, a third authentication information receiving unit 152, a communication request receiving unit 153, an authentication unit 154, and a service receiver 155. In a case where the external system 15 is configured of a plurality of devices, the configurational components (151 to 155) may be provided as respective separate devices. In addition, the management system may be configured to include a device having two or more functions of the configurational components and a device functioning as another configurational component.

Figure 9:
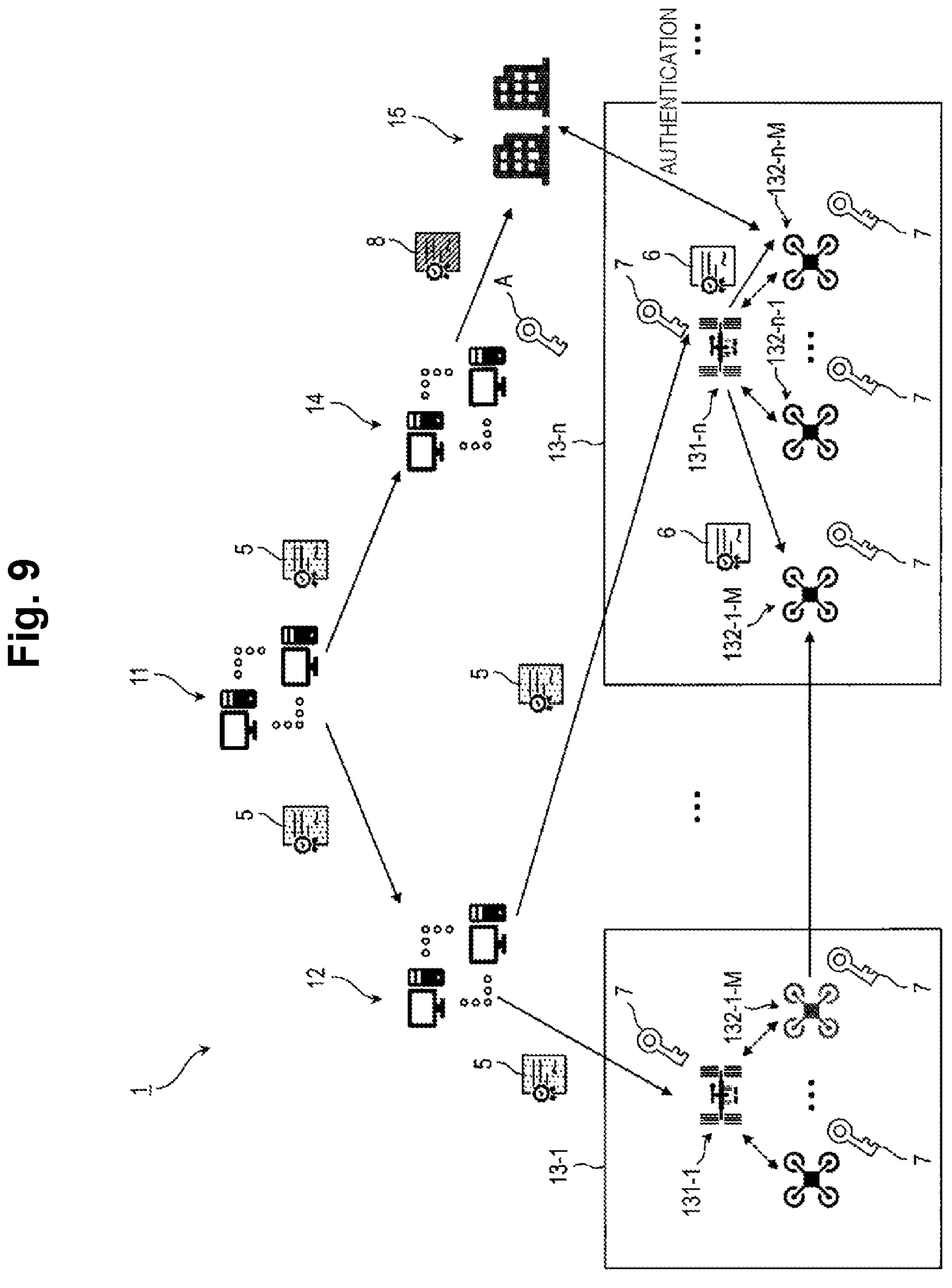
FIG. 9 is a diagram illustrating an outline of an operation of the authentication system of Example 1.

As illustrated in FIG. 9, the authentication system 1 of the present example is characterized in that authority management has a hierarchical structure, and the central control system 12 manages only authentication information (first authentication information 5 in the drawing) of the master vehicle 131. Any item of authentication information can be used as the first authentication information, but for example, when the systems are combined by an ID-based encryption method, the first authentication information=a private key (see Example 2 for details thereof).

The master vehicle 131 has a secure environment such as a secure element (SE) or a trusted execution environment (TEE) and manages and distributes authentication information (second authentication information 6 in the same drawing) of the slave vehicle 132.

Only authentication information (fourth authentication information 7 in the same drawing) by which it can be checked that the master vehicle 131 and the slave vehicle 132 are authorized terminals is distributed to the slave vehicle 132 in advance. Examples of the fourth authentication information 7 include image recognition using a pre-shared key or a physical feature. For example, as illustrated in the drawing, in a case where the slave vehicle 132-1-M belonging to the group 13-1 is reassigned to the group 13-*n*, the master vehicle 131-*n* of the group 13-*n* distributes the fourth authentication information 7 to the newly assigned slave vehicle 132-1-M in advance and enters into a state in which it is possible to check that both vehicles are authorized terminals.

In addition, the management system 14 distributes, in advance, authentication information (fifth authentication information A in the same drawing) used for authentication with the external system 15.

Figure 10:
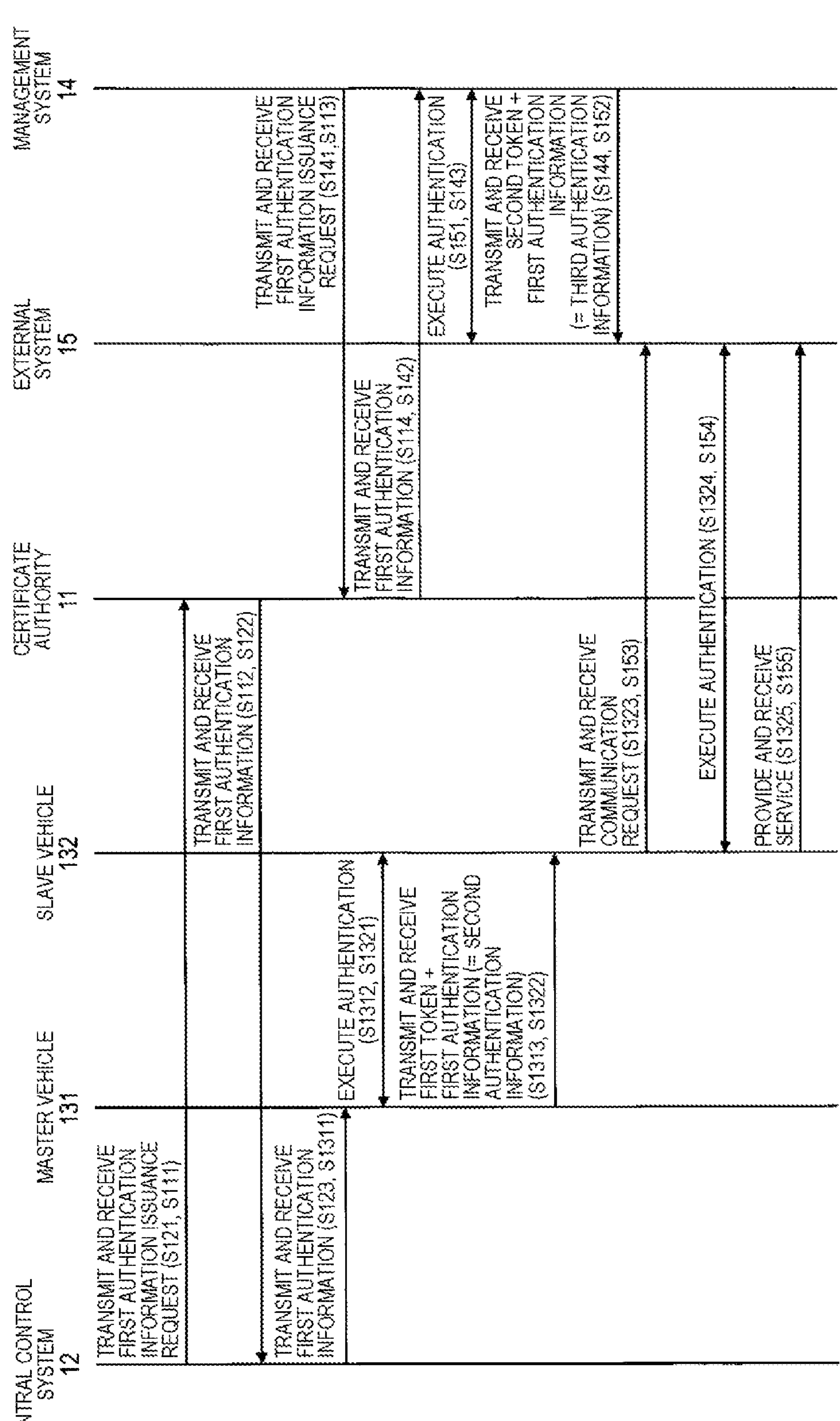
FIG. 10 is a sequence diagram illustrating the operation of the authentication system of Example 1.

Hereinafter, an operation of each device of the authentication system 1 of the present example will be described for each configurational component on the basis of the sequence of FIG. 10.

<Central Control System 12—First Authentication Information Issuance Request Transmitting Unit 121>

First, the first authentication information issuance request transmitting unit 121 of the central control system 12 transmits a first authentication information issuance request to the certificate authority 11 (S121).

<Certificate Authority 11—First Authentication Information Issuance Request Receiving Unit 111>

The first authentication information issuance request receiving unit 111 of the certificate authority 11 receives a first authentication information issuance request from the central control system 12 (S111).

<Certificate Authority 11—First Authentication Information Transmitting Unit 112>

The first authentication information transmitting unit 112 of the certificate authority 11 issues first authentication information and transmits the first authentication information to the central control system 12 (S112).

<Central Control System 12—First Authentication Information Receiving Unit 122>

The first authentication information receiving unit 122 of the central control system 12 receives the first authentication information from the certificate authority 11 (S122).

<Central Control System 12—First Authentication Information Transmitting Unit 123>

The first authentication information transmitting unit 123 of the central control system 12 transmits the first authentication information received from the certificate authority 11 to the master vehicle 131 (S123).

<Master Vehicle 131—First Authentication Information Receiving Unit 1311>

The first authentication information receiving unit 1311 of the master vehicle 131 receives the first authentication information from the central control system 12 (S1311).

<Master Vehicle 131—Authentication Unit 1312>

The authentication unit 1312 of the master vehicle 131 executes authentication with the slave vehicle 132 belonging to the same group (S1312). The above-described fourth authentication information 7 (FIG. 9) is used for the authentication. The master vehicle 131 preferably executes the authentication with the slave vehicle 132 by using proximity communication (Bluetooth (registered trademark), NFC, or the like).

The present system has a feature in that the master vehicle 131, which is an unmanned vehicle functions as an intermediate certificate authority, and conventional authentication systems do not have this feature. Hence, the intermediate certificate authority itself which is the unmanned vehicle can move (navigate, travel, fly) and can establish proximity communication in proximity to the slave vehicle 132, and thus it is possible to reduce a risk of occurrence of impersonation, operational errors, or the like, and to establish secure communication by a method that the conventional authentication systems do not have.

<Slave Vehicle 132—Authentication Unit 1321>

The authentication unit 1321 of the slave vehicle 132 executes authentication with the master vehicle 131 belonging to the same group (S1321). The above-described fourth authentication information 7 (FIG. 9) is used for the authentication. The slave vehicle 132 preferably executes the authentication with the master vehicle 131 by using the proximity communication.

<Master Vehicle 131—Second Authentication Information Transmitting Unit 1313>

The second authentication information transmitting unit 1313 of the master vehicle 131 transmits second authentication information including a first token with an expiration date and the first authentication information to the slave vehicle 132 authenticated in steps S1312 and S1321 (S1313). The second authentication information transmitting unit 1313 of the master vehicle 131 preferably transmits the second authentication information to the slave vehicle 132 by using the proximity communication.

The first token is preferably a one-time token that the master vehicle 131 dispenses to the slave vehicle 132. The authentication/authority information and an expiration date are written in the one-time token so that it can be checked that the external system 15 is a valid counterpart. For example, in the case where the system is combined by the ID-based encryption method, the first token may be an ID of the slave vehicle 132.

<Slave Vehicle 132—Second Authentication Information Receiving Unit 1322>

The second authentication information receiving unit 1322 of the slave vehicle 132 authenticated in steps S1312 and S1321 receives the second authentication information from the master vehicle 131 (S1322). The second authentication information receiving unit 1322 preferably receives the second authentication information by using the proximity communication.

<Management System 14—First Authentication Information Issuance Request Transmitting Unit 141>

The first authentication information issuance request transmitting unit 141 of the management system 14 transmits a first authentication information issuance request to the certificate authority 11 (S141).

<Certificate Authority 11—First Authentication Information Issuance Request Receiving Unit 113>

The first authentication information issuance request receiving unit 113 of the certificate authority 11 receives the first authentication information issuance request from the management system 14 (S113).

<Certificate Authority 11—First Authentication Information Transmitting Unit 114>

The first authentication information transmitting unit 114 of the certificate authority 11 issues the first authentication information and transmits the first authentication information to the management system 14 (S114).

<Management System 14—First Authentication Information Receiving Unit 142>

The first authentication information receiving unit 142 of the management system 14 receives the first authentication information from the certificate authority 11 (S142).

<External System 15—Authentication Unit 151>

The authentication unit 151 of the external system 15 executes authentication with the management system 14 (S151). The above-described fifth authentication information A (FIG. 9) is used for the authentication.

<Management System 14—Authentication Unit 143>

The authentication unit 143 of the management system 14 executes authentication with the external system 15 (S143). The above-described fifth authentication information A (FIG. 9) is used for the authentication.

<Management System 14—Third Authentication Information Transmitting Unit 144>

The third authentication information transmitting unit 144 of the management system 14 transmits, to the authenticated external system 15, third authentication information including a second token and the first authentication information received from the certificate authority 11 (S144). For example, in the case where the system is combined by the ID-based encryption method, the second token may be an ID of the external system 15.

<External System 15—Third Authentication Information Receiving Unit 152>

The third authentication information receiving unit 152 of the external system 15 receives the third authentication information from the management system 14 (S152).

<Slave Vehicle 132—Communication Request Transmitting Unit 1323>

The communication request transmitting unit 1323 of the slave vehicle 132 transmits a communication request to the external system 15 (S1323).

<External System 15—Communication Request Receiving Unit 153>

The communication request receiving unit 153 of the external system 15 receives the communication request from the slave vehicle 132 (S153).

<External System 15—Authentication Unit 154>

The authentication unit 154 of the external system 15 executes authentication with the slave vehicle 132 which is a source of the communication request on the basis of the second authentication information and the third authentication information (S154). For example, in the case where the system is combined by the ID-based encryption method, authentication can be executed by a method described in Reference Patent Literature 1 by using the ID of the slave vehicle 132, the ID of the external system 15, and the private key.

(Reference Patent Literature 1: JP 2021-019223 A

<Slave Vehicle 132—Authentication Unit 1324>

The authentication unit 1324 of the slave vehicle 132 executes authentication with the external system 15 which is a transmission destination of the communication request on the basis of the second authentication information and the third authentication information (S1324). Similarly to step S154, in the case where the system is combined by the ID-based encryption method, the authentication can be executed by the method described in Reference Patent Literature 1.

<Slave Vehicle 132—Service Providing Unit 1325>

The service providing unit 1325 of the authenticated slave vehicle 132 provides a service to the authenticated external system (S1325). As a representative example of the service, there is a logistics service or the like. As a specific example of the external system 15, a system or the like for keeping goods can be considered.

<External System 15—Service Receiver 155>

The service receiver 155 of the authenticated external system 15 receives a service from the authenticated slave vehicle 132 (S155). In a case of a logistics service, this operation corresponds to the receipt of goods.

Example 2

Figure 11:
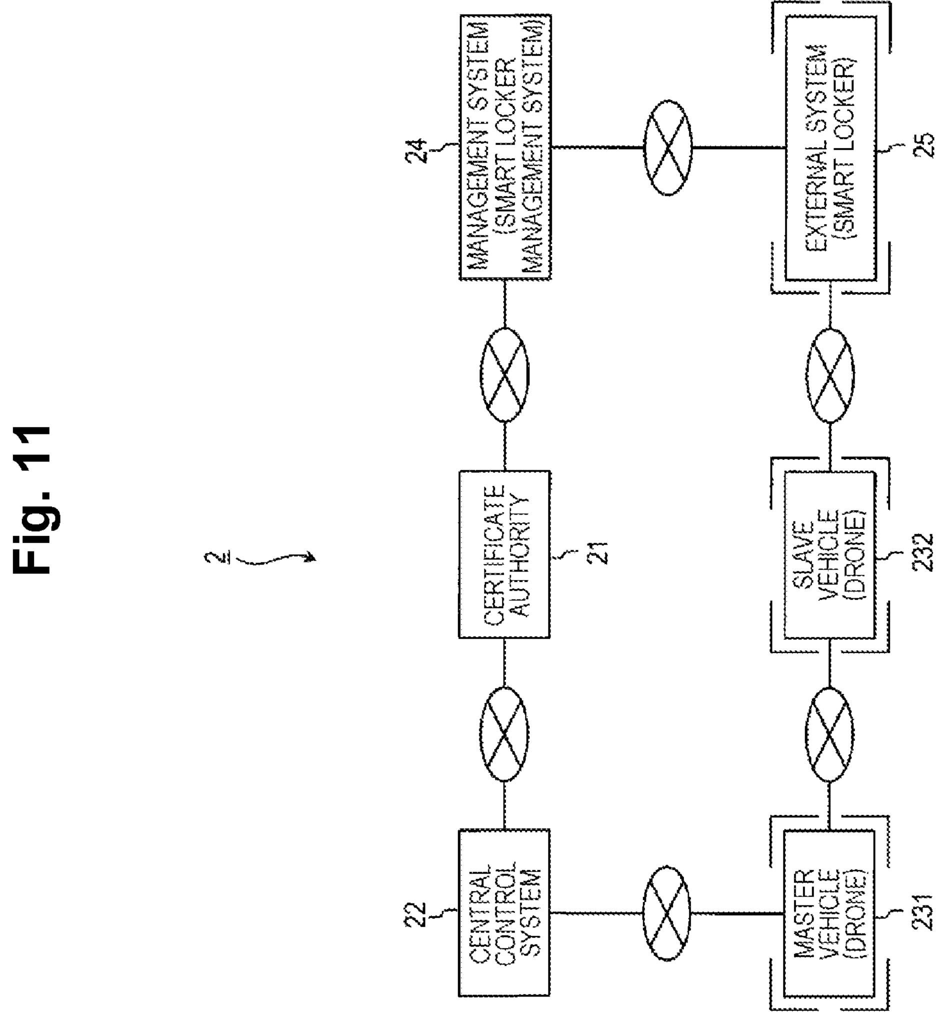
FIG. 11 is a block diagram illustrating a functional configuration of an authentication system of Example 2.
Figure 12:
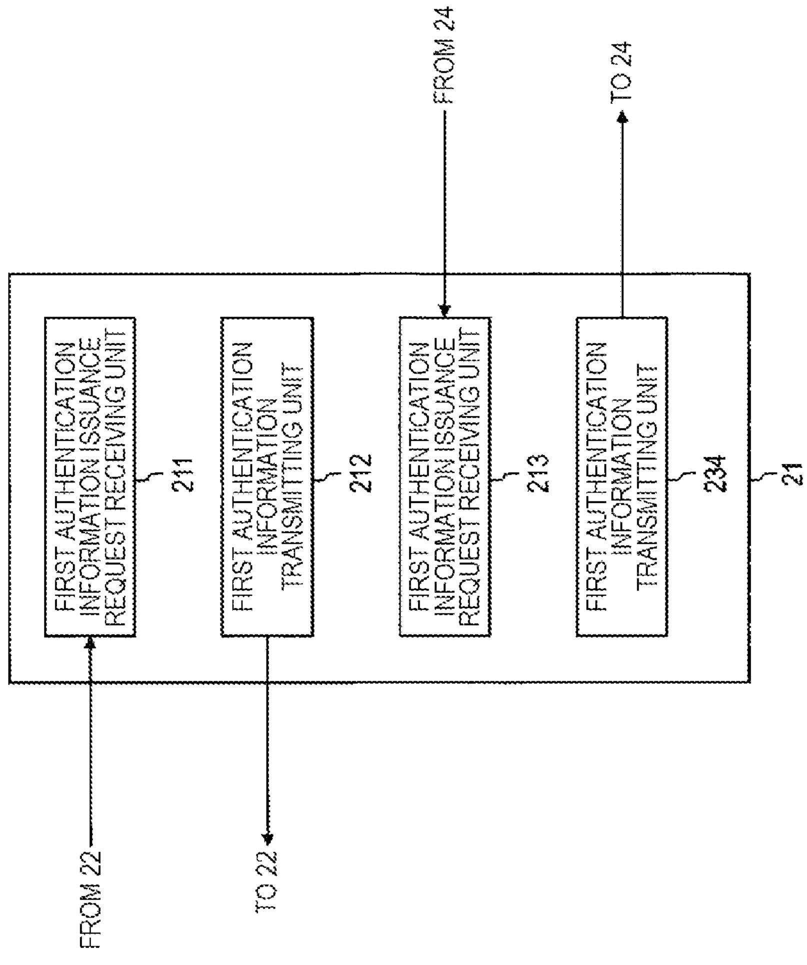
FIG. 12 is a block diagram illustrating a functional configuration of a certificate authority of Example 2.
Figure 13:
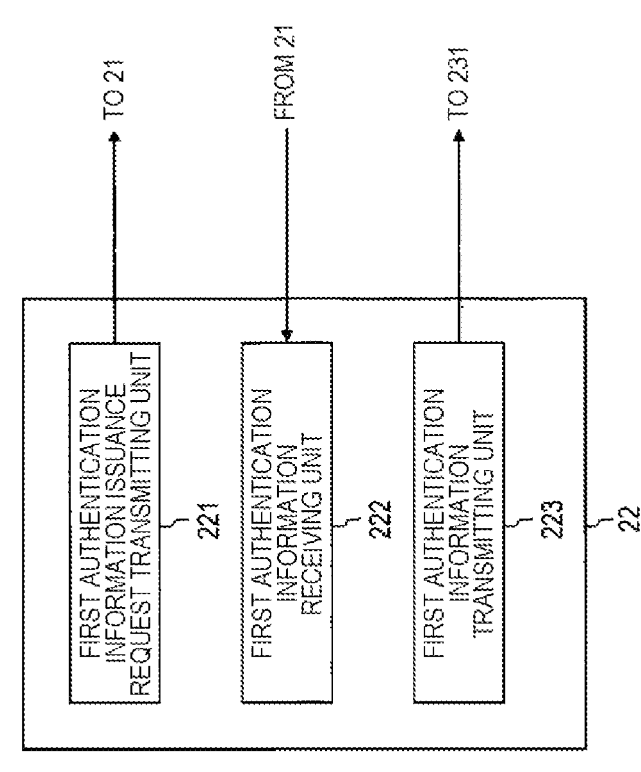
FIG. 13 is a block diagram illustrating a functional configuration of a central control system of Example 2.
Figure 14:
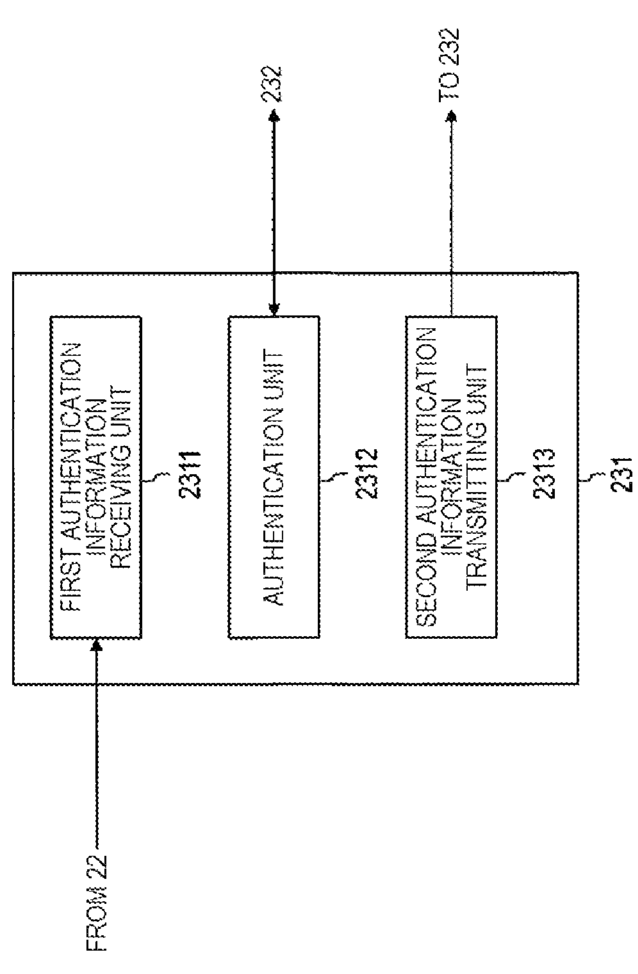
FIG. 14 is a block diagram illustrating a functional configuration of a master vehicle of Example 2.
Figure 15:
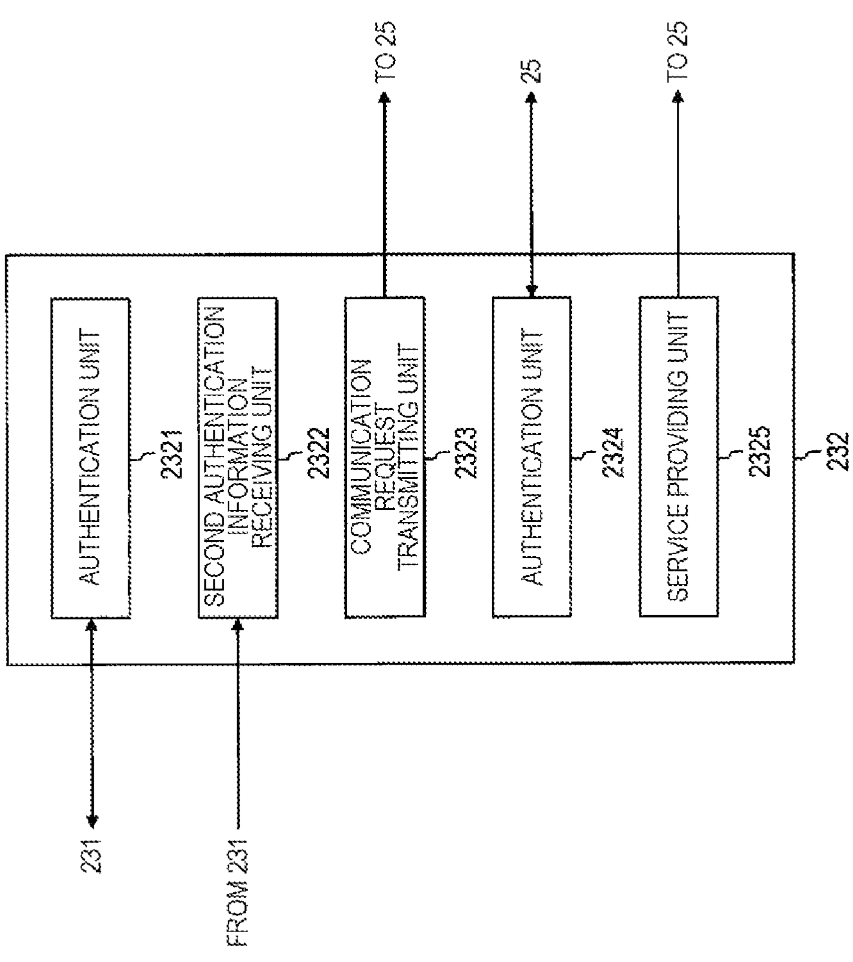
FIG. 15 is a block diagram illustrating a functional configuration of a slave vehicle of Example 2.
Figure 16:
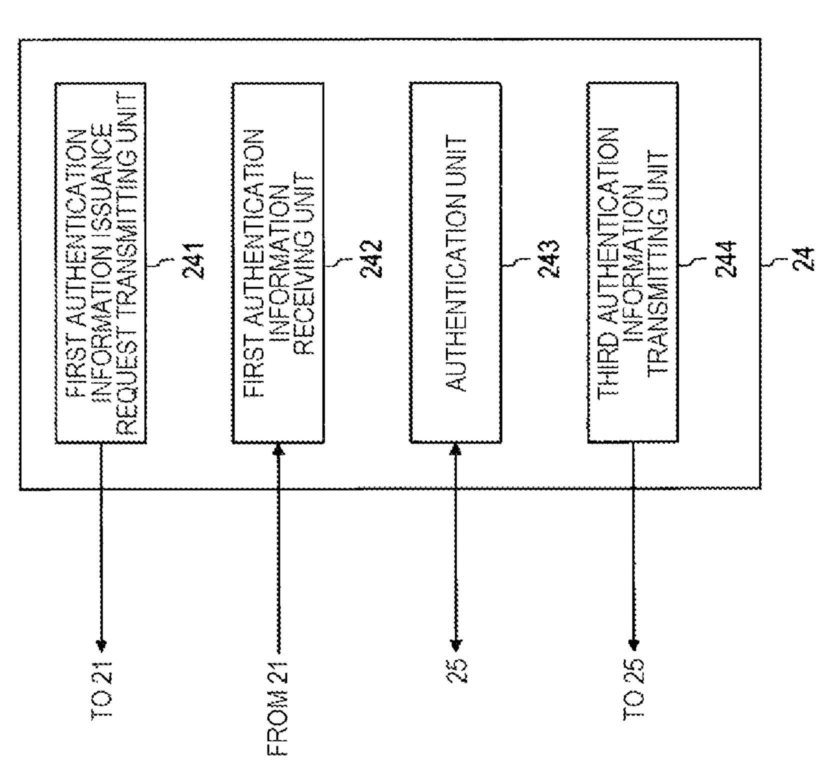
FIG. 16 is a block diagram illustrating a functional configuration of a management system of Example 2.
Figure 17:
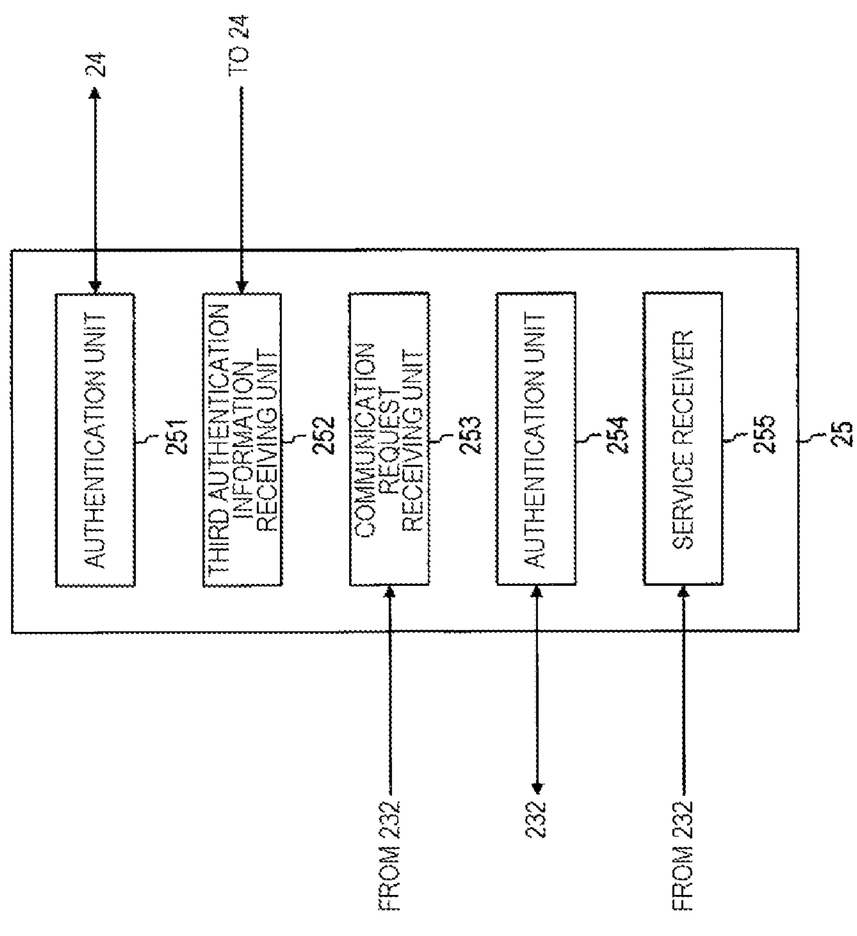
FIG. 17 is a block diagram illustrating a functional configuration of an external system of Example 2.

Hereinafter, a functional configuration of an authentication system 2 of Example 2 in which the authentication system 1 of Example 1 is configured by the ID-based encryption method will be described with reference to FIG. 11. As illustrated in the drawing, the authentication system 2 of the present example includes a certificate authority 21, a central control system 22, a master vehicle 231, a slave vehicle 232, a management system 24, and an external system 25.

In the present example, an unmanned vehicle (the master vehicle 231 or the slave vehicle 232) is a drone, the management system 24 is a smart locker management system, and the external system 25 is a smart locker. In addition, the present example is characterized in that the first authentication information is a private key, the first token is the ID of the slave vehicle, the second token is the ID of the external system, and the slave vehicle 232 and the external system 25 execute authentication by the ID-based encryption method on the basis of the ID of the slave vehicle 232, the ID of the external system 25, and the private key.

FIGS. 12 to 17 illustrate functional configurations of devices and the system. The names of the configurational components of the devices and the system are the same as those in Example 1, and some of the reference numerals are changed.

More specifically, the certificate authority 21 includes a first authentication information issuance request receiving unit 211, a first authentication information transmitting unit 212, a first authentication information issuance request receiving unit 213, and a first authentication information transmitting unit 234. The central control system 22 includes a first authentication information issuance request transmitting unit 221, a first authentication information receiving unit 222, and a first authentication information transmitting unit 223. The master vehicle 231 includes a first authentication information receiving unit 2311, an authentication unit 2312, and a second authentication information transmitting unit 2313. The slave vehicle 232 includes an authentication unit 2321, a second authentication information receiving unit 2322, a communication request transmitting unit 2323, an authentication unit 2324, and a service providing unit 2325. The management system 24 includes a first authentication information issuance request transmitting unit 241, a first authentication information receiving unit 242, an authentication unit 243, and a third authentication information transmitting unit 244. The external system 25 includes an authentication unit 251, a third authentication information receiving unit 252, a communication request receiving unit 253, an authentication unit 254, and a service receiver 255.

The master vehicle 231, the slave vehicle 232, and the external system 25 are disposed in a secure environment such as a TEE or an SE, and each block is illustrated in square brackets to indicate a state of being disposed in the secure environment. In the present example, an intermediate key issuing authority (intermediate KGC) under the control of the certificate authority 21 which is a root key issuing authority (KGC) is disposed in the secure environment of the master vehicle 231 and in the management system 24.

Hereinafter, operations of devices of the authentication system 2 of the present example will be described on the basis of the sequence of FIG. 18.

<Steps S221, S211, S212, S222, S223, and S2311>

In steps S121, S111, S112, S122, S123, and S1311 of Example 1, the operation of rereading the first authentication information→the private key is executed according to the configurational components having the same names.

<Steps S2312 and S2321>

The same operations as those in steps S1312 and S1321 of Example 1 are executed by the respective configurational components having the same names.

<Steps S2313 and S2322>

In steps S1313 and S1322 of Example 1, the operations of rereading the first token→the transport main information, the ID (public key) of the slave vehicle 232 incorporating an authority expiration date, and the first authentication information→the private key is executed according to the configurational components having the same name.

<Steps S241, S213, S214, and S242>

In steps S141, S113, S114, and S142 of Example 1, the operations of rereading the first authentication information→the private key is executed according to the configurational components having the same name.

<Steps S251 and S243>

The same operations as those in steps S151 and S143 of Example 1 are executed by the configurational components having the same names.

<Steps S244 and S252>

In steps S144 and S152 of Example 1, the operations of rereading the second token→the ID of the external system 25 (smart locker) and the first authentication information→the private key is executed according to the configurational components having the same name.

<Steps S2323 and S253>

The same operations as those in steps S1323 and S153 of Example 1 are executed by the configurational components having the same names.

<Steps S2324 and S254>

In steps S2324 and S254, authentication can be executed by the method described in Reference Patent Literature 1 by using the ID of the slave vehicle 232, the ID of the external system 25 (smart locker), and the private key.

<Steps S2325 and S255>

The same operations as those in steps S1325 and S155 of Example 1 are executed by the configurational components having the same names. In the present example, since transport of goods by the drone formation is the content of the service, the transport corresponds to delivery and receipt of the transported goods.

According to the authentication systems 1 and 2 of Examples 1 and 2, even in the case where there are an enormous number of unmanned vehicles or groups of unmanned vehicles which are management targets, individual management costs can be reduced, and thus, the central management of the authentication information or authority can be performed. In addition, it is possible to change the assignment of the unmanned vehicle groups at any timing.

Example 3

As illustrated in FIG. 19, the unmanned vehicles (the master vehicle and the slave vehicle) described in Examples 1 and 2 may not be unmanned vehicles that autonomously move but may be replaced with IoT devices 331 and 332 that are fixedly installed. As illustrated in the drawing, an authentication system 3 of Example 3 is configured by replacing the unmanned vehicles (the master vehicle and the slave vehicle) in Example 1 with IoT devices (a master vehicle 331 and a slave vehicle 332).

Modification Examples

The authentication systems 1 to 3 of Examples 1 to 3 are not limited to hierarchical ID-based encryption but may be realized in an embodiment in which other authentication means including, for example, hierarchical ID-based encryption with a revocation function is prepared. For example, the authentication systems may have a configuration in which an intermediate CA is disposed in the master vehicle by utilizing a public key infrastructure, or may be realized by a unique authentication method in which the master vehicle can issue authentication information.

Supplementary Notes

The device according to the present invention includes, for example, an input unit that can be connected to a keyboard or the like as a single hardware entity, an output unit that can be connected to a liquid crystal display or the like, a communication unit that can be connected to a communication device (e.g., a communication cable) capable of communicating with the outside of the hardware entity, a central processing unit (CPU which may include a cache memory or a register), a RAM or a ROM which is a memory, an external storage device as a hard disk, and a bus that connects the input unit, the output unit, the communication unit, the CPU, the RAM, the ROM, and the external storage device so that data can be exchanged therebetween. A device (drive) or the like that can write and read data in and from a recording medium such as a CD-ROM may be provided in the hardware entity, as necessary. Examples of a physical entity including such hardware resources include a general-purpose computer and the like.

The external storage device of the hardware entity stores a program necessary for realizing the above-described functions, data necessary for processing of the program, and the like (the present invention is not limited to the external storage device, for example, the program may be stored in a ROM that is a read-only storage device). Data or the like obtained by the processing of these programs is appropriately stored in a RAM, an external storage device, or the like.

In the hardware entity, each program stored in the external storage device (or ROM or the like) and data required for processing of each program are read into a memory as necessary and are appropriately interpreted and processed by the CPU. As a result, the CPU implements a predetermined function (configurational components represented as . . . unit, . . . means, or the like).

The present invention is not limited to the above-described embodiments and can be appropriately modified without departing from the gist of the present invention. The pieces of processing described in the foregoing embodiments may be executed not only chronologically in accordance with the described order, but also in parallel or individually in accordance with the processing capability of a device that executes the processing or as necessary.

As described above, in a case in which the processing function in the hardware entity (the device of the present invention) described in the above embodiment is realized by a computer, details of processing of the function that the hardware entity should have are written by a program. The computer then executes the program, and thus, the processing function of the hardware entity is implemented in the computer.

Figure 20:
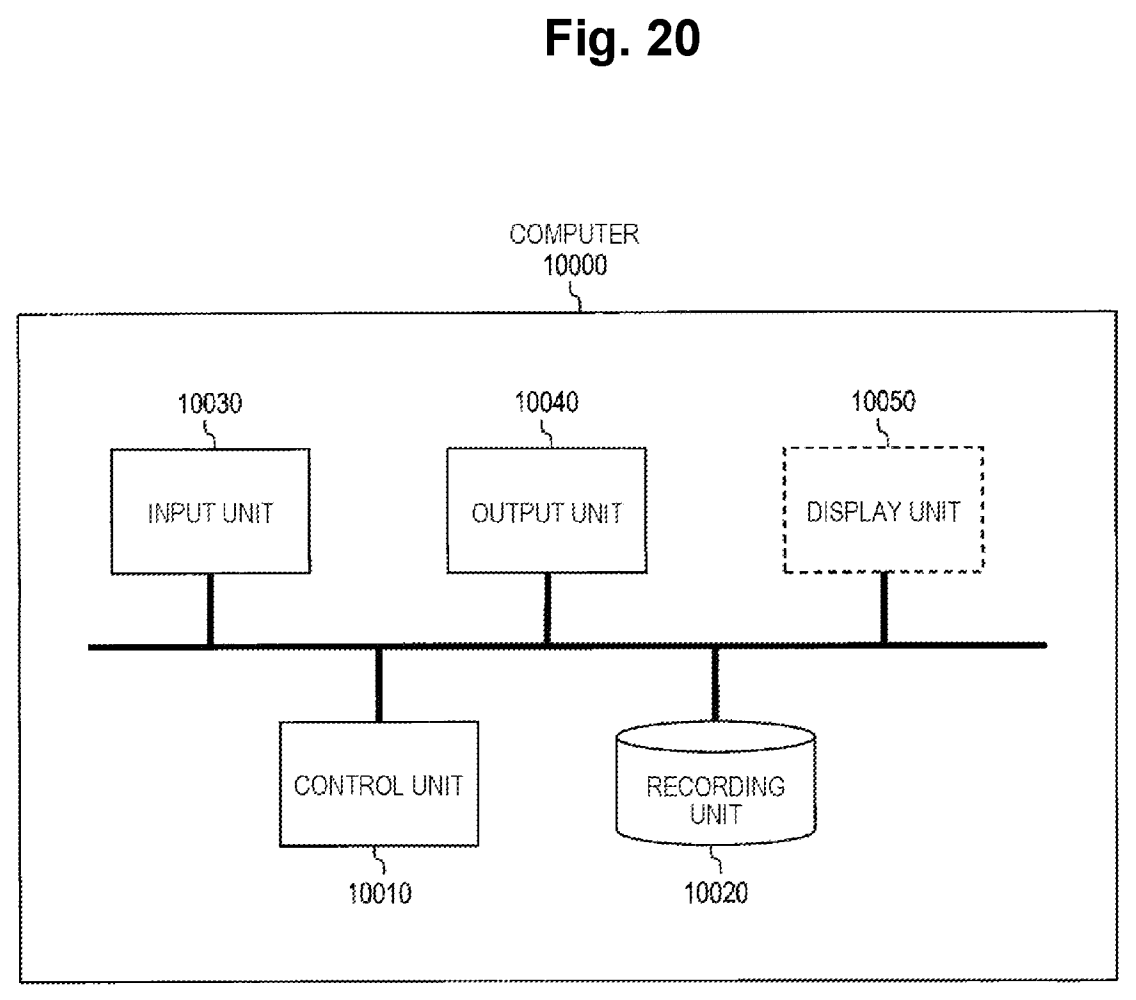

The various kinds of processing described above can be performed by causing a recording unit 10020 of a computer illustrated in FIG. 20 to read a program for executing each step of the method described above and causing a control unit 10010, an input unit 10030, an output unit 10040, and the like to operate.

The program in which details of processing are written can be recorded in a computer-readable recording medium. The computer-readable recording medium may be, for example, any recording medium such as a magnetic recording device, an optical disc, a magneto-optical recording medium, or a semiconductor memory. Specifically, for example, a hard disk device, a flexible disk, a magnetic tape, or the like can be used as the magnetic recording device, a digital versatile disc (DVD), a DVD random access memory (DVD-RAM), a compact disc read only memory (CD-ROM), a CD recordable/rewritable (CD-R/RW), or the like can be used as the optical disc, a magneto-optical disc (MO) or the like can be used as the magneto-optical recording medium, and an electrically erasable and programmable-read only memory (EEP-ROM) or the like can be used as the semiconductor memory.

Furthermore, distribution of the program is performed by, for example, selling, transferring, or renting a portable recording medium such as a DVD or a CD-ROM in which the program is recorded. Furthermore, the program may be stored in a storage device of a server computer, and the program may be distributed by transferring the program from the server computer to another computer via a network.

For example, a computer for executing such a program first temporarily stores a program recorded on a portable recording medium or a program transferred from a server computer in a storage device of the computer. When executing processing, the computer reads the program stored in the recording medium of the own computer and executes the processing according to the read program. As another mode of the program, the computer may read the program directly from the portable recording medium and execute processing according to the program, or alternatively, the computer may sequentially execute processing according to a received program every time the program is transferred from the server computer to the computer. The above-described processing may be executed by a so-called application service provider (ASP) type service that implements a processing function only by an execution instruction and result acquisition without transferring the program from the server computer to the computer. Note that the program in the present embodiment includes information used for processing by an electronic computer and equivalent to the program (data or the like that is not a direct command to the computer but has a property that defines processing of the computer).

Moreover, although the hardware entity is formed by executing a predetermined program in a computer in this mode, at least some of the processing details may be implemented by hardware.

The invention claimed is:

1. An authentication system comprising: a certificate authority; a central control system; a group including a first unmanned vehicle that is a master vehicle and a second unmanned vehicle that is a slave vehicle; a management system; and an external system, wherein the central control system transmits, to the master vehicle, first authentication information received from the certificate authority, the master vehicle executes authentication with the slave vehicle belonging to a same group as the master vehicle, and transmits second authentication information including a first token with an expiration date and the first authentication information to the slave vehicle that is authenticated, the management system executes authentication with the external system, and transmits, to the external system that is authenticated, third authentication information including a second token and the first authentication information received from the certificate authority, and the slave vehicle and the external system each executes authentication based on the second authentication information and the third authentication information.

2. The authentication system according to claim 1, wherein the master vehicle executes the authentication with the slave vehicle by using proximity communication.

3. The authentication system according to claim 1, wherein the master vehicle transmits the second authentication information to the slave vehicle by using proximity communication.

4. The authentication system according to claim 2, wherein the first or second unmanned vehicle is a drone, and the external system is a smart locker.

5. The authentication system according to claim 1, wherein the first authentication information is a private key, the first token is an ID of the slave vehicle, the second token is an ID of the external system, and the slave vehicle and the external system execute the authentication by an ID-based encryption method based on the ID of the slave vehicle, the ID of the external system, and the private key.

6. A method for authentication executed by a certificate authority, a central control system, a first unmanned vehicle that is a master vehicle, a second unmanned vehicle that is a slave vehicle, a management system, and an external system, the method comprising:

transmitting, by the central control system, first authentication information received from the certificate authority to the master vehicle;

executing, by the master vehicle, authentication with the slave vehicle belonging to a same group as the master vehicle;

transmitting, by the master vehicle to the slave vehicle that is authenticated, second authentication information including a first token with an expiration date and the first authentication information;

executing, by the management system, authentication with the external system;

transmitting, by the management system to the external system that is authenticated, third authentication information including a second token and the first authentication information received from the certificate authority; and executing, by the slave vehicle and the external system, authentication based on the second authentication information and the third authentication information.

7. A computer-readable non-transitory recording medium storing computer-executable program instructions that when executed by a processor cause a computer to execute a method comprising:

transmitting, by a central control system, first authentication information received from a certificate authority to a master vehicle;

executing, by the master vehicle, authentication with a slave vehicle belonging to a same group as the master vehicle;

transmitting, by the master vehicle to the slave vehicle that is authenticated, second authentication information including a first token with an expiration date and the first authentication information;

executing, by a management system, authentication with an external system;

transmitting, by the management system to the external system that is authenticated, third authentication information including a second token and the first authentication information received from the certificate authority; and executing, by the slave vehicle and the external system, authentication based on the second authentication information and the third authentication information.

8. A computer-readable non-transitory recording medium storing computer-executable program instructions that when executed by a processor cause an unmanned vehicle to function as the master vehicle and execute the authentication with the slave vehicle belonging to the same group as the master vehicle and to transmit the second authentication information to the slave vehicle that is authenticated according to claim 7.

9. A computer-readable non-transitory recording medium storing computer-executable program instructions that when executed by a processor cause an unmanned vehicle to function as the slave vehicle and execute authentication based on the second authentication information and the third authentication information according to claim 7.

10. A computer-readable non-transitory recording medium storing computer-executable program instructions that when executed by a processor cause a computer to function as the central control system and transmit, to the master vehicle, the first authentication information received from the certificate authority according to claim 7.

11. The authentication system according to claim 3, wherein the first or second unmanned vehicle is a drone, and the external system is a smart locker.

12. The authentication system according to claim 2, wherein the first authentication information is a private key, the first token is an ID of the slave vehicle, the second token is an ID of the external system, and the slave vehicle and the external system execute the authentication by an ID-based encryption method based on the ID of the slave vehicle, the ID of the external system, and the private key.

13. The authentication system according to claim 3, wherein the first authentication information is a private key, the first token is an ID of the slave vehicle, the second token is an ID of the external system, and the slave vehicle and the external system execute the authentication by an ID-based encryption method based on the ID of the slave vehicle, the ID of the external system, and the private key.

14. The method according to claim 6, wherein the executing, by the master vehicle, authentication with the slave vehicle includes: executing the authentication by using proximity communication.

15. The method according to claim 6, wherein the transmitting, by the master vehicle to the slave vehicle that is authenticated, second authentication information includes: transmitting the second authentication information to the slave vehicle by using proximity communication.

16. The method according to claim 6, wherein one or more of the master vehicle or the slave vehicle is a drone, and the external system is a smart locker.

17. The method according to claim 6, wherein the first authentication information is a private key, the first token is an ID of the slave vehicle, the second token is an ID of the external system, and the executing, by the slave vehicle and the external system, authentication based on the second authentication information and the third authentication information includes: executing, by the slave vehicle and the external system, the authentication by using an ID-based encryption method based on the ID of the slave vehicle, the ID of the external system, and the private key.

* * * * *